United States Patent [19]
Benjamin et al.

[11] 4,106,781
[45] Aug. 15, 1978

[54] UNITIZED, GREASE-PURGEABLE SEAL

[75] Inventors: Martin E. Benjamin, Gastonia, N.C.; Dean R. Bainard, Bethel Township, York County, S.C.

[73] Assignee: Garlock Inc., Rochester, N.Y.

[21] Appl. No.: 791,866

[22] Filed: Apr. 28, 1977

[51] Int. Cl.$^2$ .............................................. F16J 15/32
[52] U.S. Cl. ........................................ 277/82; 277/152
[58] Field of Search ............. 277/92, 94, 35, 37, 277/152, 153

[56] References Cited

U.S. PATENT DOCUMENTS

| | | | |
|---|---|---|---|
| 3,561,770 | 2/1971 | Corsi | 277/35 |
| 3,792,712 | 2/1974 | Howe et al. | 277/94 |
| 3,869,181 | 3/1975 | Barber | 277/94 |
| 3,963,248 | 6/1976 | Bainard | 277/82 |

*Primary Examiner*—Robert I. Smith
*Attorney, Agent, or Firm*—Schovee & Boston

[57] ABSTRACT

A unitized, grease-purgeable shaft seal including a wear sleeve and an elastomeric member having an inner sealing element extending toward the wear sleeve on one side of a wear sleeve flange and having an outer sealing element extending toward the wear sleeve on the other side of the flange whereby the seal is unitized. Each of the sealing elements includes an outwardly facing sealing lip, whereby the seal is grease purgeable.

5 Claims, 5 Drawing Figures

UNITIZED, GREASE-PURGEABLE SEAL

BACKGROUND OF THE INVENTION

1. Field of the Invention

This invention relates to shaft seals and in particular to a unitized seal that is also grease-purgeable.

2. Description of the Prior Art

While unitized dual-lip seals are known (see, for example, U.S. Pat. No. 3,963,248 assigned to the same assignee as is the present application) and while grease-purgeable seals are also known in the art, there are no known seals that are both unitized and grease-purgeable. Previous unitized seals were not grease-purgeable, and previous nonunitized, grease-purgeable seals were difficult to properly install (see, for example, the prior art seal shown in FIG. 1 of this application).

It is an object of the present invention to overcome the problems in the prior art by providing a seal that is unitized, grease-purgeable, and easy to properly install.

SUMMARY OF THE INVENTION

A unitized, grease-purgeable shaft seal including a wear sleeve to be installed on one of a shaft or housing bore and an annular elastomeric member to be installed on the other of the shaft and bore. The wear sleeve includes a generally radially extending flange and the elastomeric member includes two sealing elements, one on either side of the flange, thus making the seal unitized. The sealing elements each have outwardly facing sealing lips movable away from and out of contact with the wear sleeve, whereby the seal is grease-purgeable.

The seal includes a plurality of circumferentially spaced-apart bumper pads which contact a distal end of the radial flange to properly locate the wear sleeve with respect to the annular elastomeric member. The flange can be either frustoconical or radial, and the outer sealing lip can seal against either a cylindrical surface or the frustoconical surface of the flange. For heavy duty use the outer sealing element can include an additional face-sealing lip in contact with the radial flange.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE PREFERRED EMBODIMENTS

Figure 1:
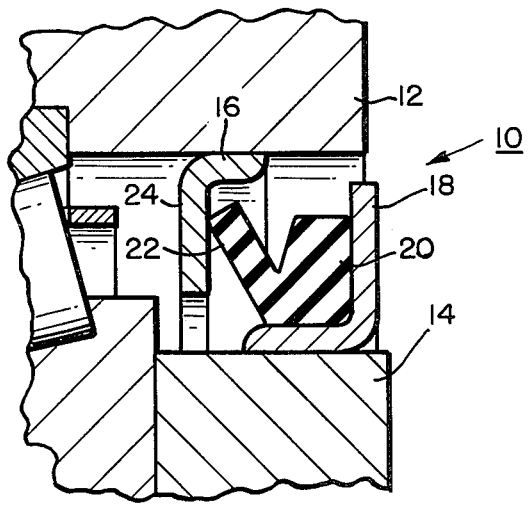
FIG. 1 is a partial cross-sectional view through a non-unitized grease-purgeable prior art seal.

Referring now to the drawings, FIG. 1 shows a prior art seal 10 for sealing the annular space between a bore of a housing 12 and a shaft 14. The seal includes a wear sleeve 16 press-fitted into the I.D. of the housing 12 and a separate sealing portion including a shell 18 and an elastomeric member 20 including a sealing lip 22 in contact with a radial flange 24 of the wear sleeve 16. While the seal 10 is grease-purgeable, it is non-unitized and it is difficult to properly install to insure the sealing function.

Figure 2:
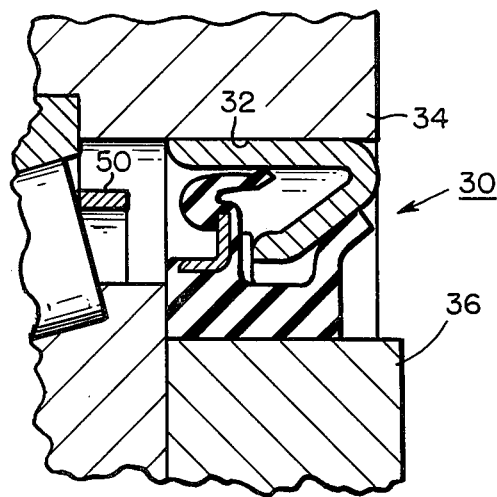
FIG. 2 is a partial cross-sectional view through a unitized grease-purgeable seal of the present invention as installed in an application similar to that shown in FIG. 1.
Figure 3:
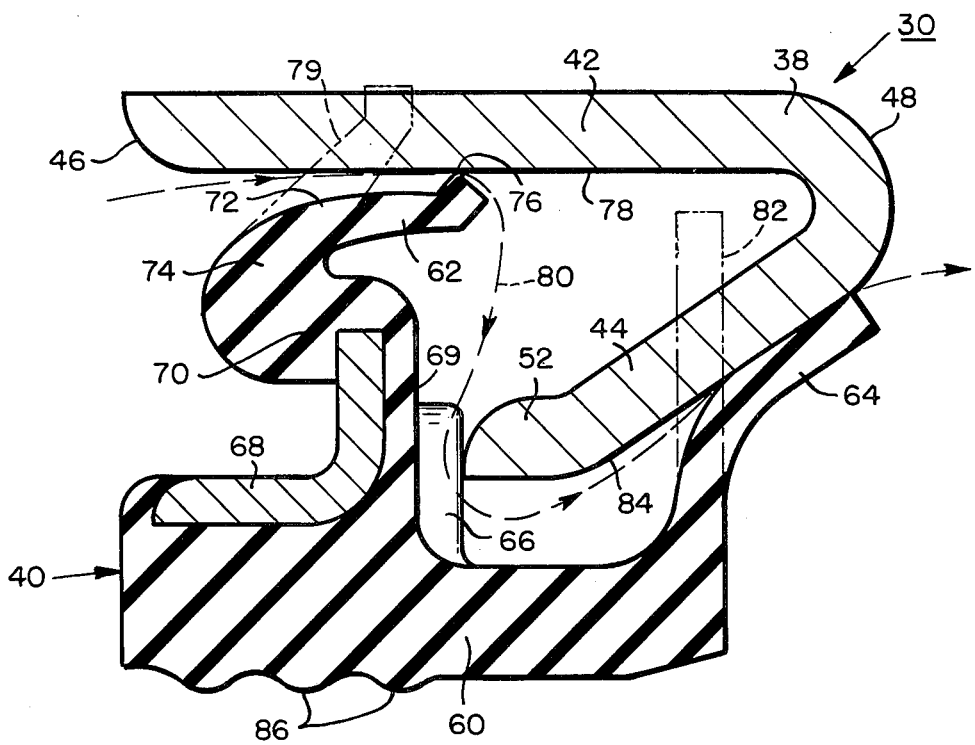
FIG. 3 is an enlarged, partial cross-sectional view of the seal of FIG. 2.

Referring now to the present invention, FIGS. 2 and 3 show a seal 30 that is unitized, grease-purgeable, easy to install and that excludes contaminants from the application. The seal 30 is shown installed in FIG. 2 for sealing the annular space between a bore 32 of a housing 34 and a shaft 36.

As more clearly shown in FIG. 3, the seal 30 includes a unitizing wear sleeve 38 and an elastomeric member 40. The wear sleeve 38 includes a cylindrical wall 42 and a frustoconical flange 44. The O.D. of the cylindrical wall 42 is a press fit in the bore 32. The cylindrical wall 42 has an axially inner end 46 and an axially outer end 48. The frustoconical flange 44 extends radially inwardly from the axially outer end 48 of the cylindrical wall 42, and terminates in an axially inwardly extending cylindrical portion 52.

The elastomeric member 40 (preferably of molded synthetic rubber) includes a main cylindrical wall 60, an inner sealing lip 62, an outer sealing lip 64, and a plurality of circumferentially spaced-apart bumper pads 66 for properly locating the wear sleeve 38 with respect to the elastomeric member 40. The terms "inner" and "outer" with respect to the sealing lips 62 and 64 mean axially inwardly and outwardly, respectively. Both of the sealing lips 62 and 64 are "outwardly facing," which term is hereby defined for purposes of the present specification and claims to mean sealing lips as shown in FIG. 3, that is, sealing lips extending from an axially inner flex portion to an axially outer distal end in contact with a surface against which the sealing lip seals and movable away from that surface when internal fluid pressure is exerted against said sealing lip, that is, fluid pressure inside the application. Thus, all of the sealing lips shown in FIG. 2-5 are "outwardly facing" including the generally radial sealing lip 94 in FIG. 4 and the additional sealing lip 100 in FIG. 5.

The inner sealing lip 62 includes a root portion 69 with a metal reinforcing ring 68, a cylindrical portion 70, a flex portion 74 and a frustoconical portion 72 (shown in dotted lines 79 in its as-molded shape). The flex portion 74 allows the inner sealing lip 62 to move away from and out of contact with an inner surface 78 of the cylindrical wall 42 when grease is forced out of the application in the direction shown by the arrows on the dotted line 80. The dotted line 80 shows the grease-purging path past the two sealing lips 62 and 64.

The outer sealing lip 64 when molded is radial (as shown by the dotted line 82) but is frustoconical in the application with the sealing lip 64 pressed in sealing contact against the radially outer surface 84 of the flange 44 of the wear sleeve 38.

The spacing or bumper pads 66 are circumferentially spaced-apart on the axially outer surface of the root portion 69 of the inner sealing lip 62. The pads 66 serve to properly locate all portions of the unitized seal 30 with respect to each other, while still allowing grease to flow (i.e. to be purged) along the path 80, which path 80 includes a portion passing between the spaced-apart pads 66 and around past the distal end of the portion 52.

The I.D. of the cylindrical wall 60 has a plurality of radially inwardly extending, spaced-apart annular ribs 86 to aid in easy installation of the elastomeric member 40 onto the shaft 36.

Figure 4:
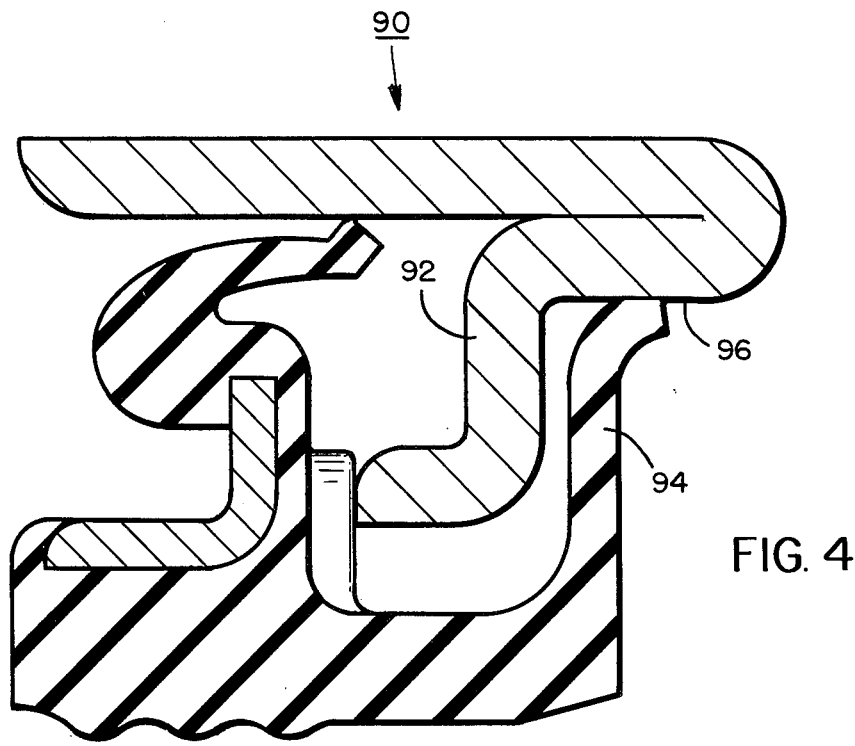
FIG. 4 is a partial cross-sectional view of another embodiment of a seal of the present invention.

FIG. 4 shows another embodiment of the present invention of a seal 90 similar to that of FIG. 3 except that the seal 90 includes a radial flange 92 rather than a frustoconical flange as in FIG. 3, and also in that an outer sealing lip 94 seals against a cylindrical I.D. surface 96 rather than against a frustoconical surface. The flange 92 terminates in a cylindrical portion in contact with bumper pads as in FIG. 3.

Figure 5:
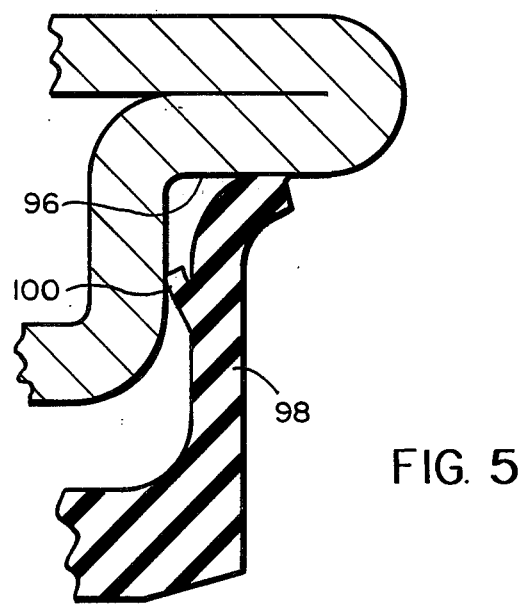
FIG. 5 is a partial cross-sectional view of still another embodiment of a seal of the present invention.

FIG. 5 shows another embodiment of the invention, identical to that shown in FIG. 4, except that the embodiment shown in FIG. 5 includes a main outer sealing lip 98 and also an additional face-sealing lip 100 in sealing contact with an axially outer radial surface of the radial flange 92, for use, for example, in heavy-duty applications. In both of the embodiments of FIGS. 4 and 5, the seal is still unitized and grease-purgeable as is the seal 30 shown in FIGS. 2 and 3.

The invention has been described in detail with particular reference to the preferred embodiments thereof, but it will be understood that variations and modifications can be effected within the spirit and scope of the invention as described hereinabove and as defined in the appended claims. For example, the location of the bumper pads and the shape of the distal end of the wear sleeve flange do not have to be as shown and described above with respect to the preferred embodiments of the invention. Also different numbers and shapes for the sealing lips can be used. The wear sleeve can alternatively be on the shaft and the elastomeric member in the bore, if desired. The distal end of the flange can have a scalloped edge to provide a grease path past it in place of the spaced-apart bumper pads.

We claim:

1. An annular, unitized, grease-purgeable shaft seal comprising:
   (a) an annular wear sleeve for installation on one of a bore and a shaft, said wear sleeve including a cylindrical wall and a flange extending toward the other of a bore and a shaft,
   (b) an annular, one-piece, elastomeric member for use on the other of a bore and shaft, said elastomeric member having a cylindrical wall, an inner sealing lip extending toward and into contact with said wear sleeve and located axially inwardly of said flange, and an outer sealing lip extending toward and into contact with said wear sleeve and located axially outwardly of said flange,
   (c) each of said sealing lips being outwardly facing sealing lips, whereby said seal provides a grease-purging path past each of said sealing lips, and
   (d) said elastomeric member including a plurality of circumferentially spaced-apart bumper pads in-between said sealing lips, said bumper pads being on an axially outwardly facing surface of a root portion of said inner sealing lip and wherein said flange includes a distal end in contact with said bumper pads for properly locating said wear sleeve with respect to said sealing lips, and for providing a grease purging path past said distal end of said flange.

2. The seal according to claim 1 wherein said flange terminates in a cylindrical lip in contact with said bumper pads.

3. The seal according to claim 2 wherein said flange is radial.

4. The seal according to claim 3 wherein said outer sealing lip includes a main sealing lip in sealing contact with an I.D. cylindrical surface of said wear sleeve and also an additional face-sealing lip in sealing contact with an axially outer radial surface of said radial flange.

5. The seal according to claim 2 wherein said flange is frustoconical.

* * * * *